US007660922B2

(12) United States Patent
Harriman

(10) Patent No.: US 7,660,922 B2
(45) Date of Patent: Feb. 9, 2010

(54) MECHANISM TO FLEXIBLY SUPPORT MULTIPLE DEVICE NUMBERS ON POINT-TO-POINT INTERCONNECT UPSTREAM PORTS

(75) Inventor: David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 592 days.

(21) Appl. No.: 11/433,018

(22) Filed: May 12, 2006

(65) Prior Publication Data

US 2007/0263642 A1 Nov. 15, 2007

(51) Int. Cl.
*G06F 13/00* (2006.01)
*G06F 9/00* (2006.01)

(52) U.S. Cl. .......................................... 710/104; 713/1

(58) Field of Classification Search .................. 710/104
See application file for complete search history.

(56) References Cited

U.S. PATENT DOCUMENTS 6,009,488 A 12/1999 Kavipurapu
6,865,618 B1 * 3/2005 Hewitt et al. .................... 710/3
6,928,498 B2 * 8/2005 Eichler et al. ............... 710/104
7,167,941 B2 * 1/2007 Iskiyan et al. ............... 710/316
7,363,405 B2 * 4/2008 Isoda ......................... 710/105
2003/0041195 A1 * 2/2003 Isoda ......................... 710/104
2004/0162975 A1 * 8/2004 Yakovlev ....................... 713/1
2004/0162976 A1 * 8/2004 Yakovlev ....................... 713/1
2007/0130453 A1 * 6/2007 Lewites ......................... 713/1
2007/0233928 A1 * 10/2007 Gough ....................... 710/301
2007/0250691 A1 * 10/2007 Cool et al. ..................... 713/1

FOREIGN PATENT DOCUMENTS

WO WO 0076174 A1 * 12/2000

* cited by examiner

*Primary Examiner*—Ryan M Stiglic
(74) *Attorney, Agent, or Firm*—Blakely, Sokoloff, Taylor & Zafman LLP

(57) ABSTRACT

A method and apparatus for supporting multiple device numbers on point-to-point interconnect upstream ports. In one embodiment, the method includes a downstream component (DC) that performs discovery of internal device components of the DC during initialization of the DC. Subsequent to the discovery of internal devices of the DC, the DC may issue a multiple device number (MDN) request to an upstream component (UC) of the DC. In one embodiment, the MDN request may include an indication that the DC supports a "multiple device number capability," as well as a quantity of the internal device components of the DC. The DC may receive an acknowledgement MDN from the UC to indicate a quantity of device numbers allocated to the DC. Subsequently, the DC may assign device numbers to the internal device components of the DC according to configuration requests received from the UC. Other embodiments are described and claimed.

20 Claims, 10 Drawing Sheets

MECHANISM TO FLEXIBLY SUPPORT MULTIPLE DEVICE NUMBERS ON POINT-TO-POINT INTERCONNECT UPSTREAM PORTS

FIELD

One or more embodiments relate generally to the field of integrated circuit and computer system design. More particularly, one or more of the embodiments relate to a method and apparatus for supporting multiple device numbers on point-to-point link upstream ports.

BACKGROUND

Meeting future system performance needs requires input/output (I/O) bandwidth that can scale with processing and application demands. Alongside these increasing performance demands, the enterprise server and communication markets require improved reliability, security and quality of service guarantees. Fortunately, technology advances and high speed point-to-point interconnects are enabling system designers to break away from the bandwidth limitations of multiple drop, parallel buses. To this end, system designers have discovered a high-performance, third generation I/O (3GIO) interconnect that will serve as a general purpose I/O interconnect for a wide variety of future computing and communications platforms.

3GIO comprehends the many I/O requirements presented across the spectrum of computing and communications platforms and rolls them into a common scalable and extensible I/O industry specification. One implementation of 3GIO is the PCI Express specification. The PCI Express basic physical layer includes a differential transmit pair and a differential receiver pair. As such, dual simplex data on these point-to-point connection referred to herein as a "point-to-point link," is self-clocked and its bandwidth increases linearly with interconnect (link) width and frequency. In addition, PCI Express also provides a message space within its bus protocol that is used to implement legacy side band signals. As a result, a further reduction of signal pins produces a very low pin count connection for components and adapters.

PCI Express (PCIe) provides backward compatibility for conventional PCI, which is based on a multi-drop parallel bus implementation. To provide backward compatibility with conventional PCI, PCIe retains the device concept of conventional PCI. As described herein, the device concept of conventional PCI requires that a device provide a one-to-one correspondence with a piece of silicon or I/O card that plugs into a slot of a computer system. Hence, PCIe retains the device concept of conventional PCI, which requires a one-to-one correspondence between devices and I/O cards, thereby limiting an I/O card to include a single internal device. Unfortunately, this limitation can create a nuisance for non-legacy software, which may be able to handle a single card, which implements multiple logical devices.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for supporting multiple device numbers on point-to-point interconnect upstream ports are described. In one embodiment, the method includes a downstream component (DC) that performs discovery of internal device components of the DC during initialization of the DC. Subsequent to the discovery of internal devices of the DC, the DC may issue a multiple device number (MDN) request to an upstream component (UC) of the DC. In one embodiment, the MDN request may include an indication that the DC supports a "multiple device number capability," as well as a count or quantity of the internal device components of the DC. In response to the MDN request, the DC component receives an MDN acknowledgement from the UC, which may indicate a quantity of device numbers allocated to the DC. Subsequently, the DC may assign device numbers to the internal device components of the DC according to configuration requests received from the UC.

Figure 1:
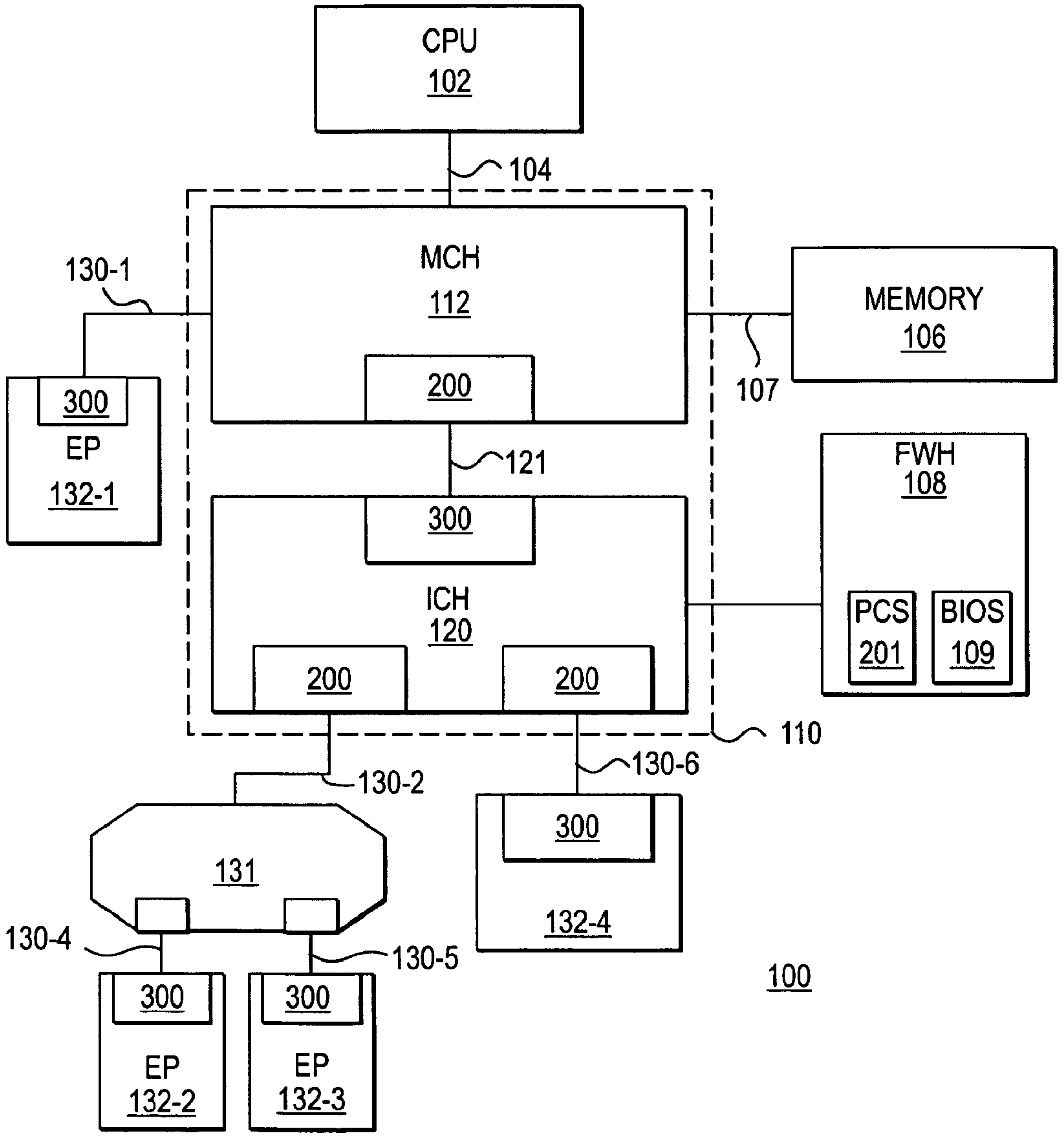
FIG. 1 is a block diagram illustrating a computer system for supporting multiple device numbers on a point-to-point link or upstream port, according to one embodiment.

FIG. 1 is a block diagram illustrating computer system 100 including multiple document number (MDN) response logic 200 and MDN request logic 300 to support MDNs on point-to-point links, in accordance with one embodiment. Representatively, computer system 100 comprises a processor system bus (front side bus (FSB)) 104 for communicating information between processor (CPU) 102 and chipset 110. As described herein, the term "chipset" is used in a manner to collectively describe the various devices coupled to CPU 102 to perform desired system functionality. In one embodiment, CPU 102 may be a multicore chip multiprocessor (CMP).

Representatively, chipset 110 may include memory controller hub (MCH) 112 coupled to endpoint (EP) 132-1, such as a graphics controller, via interconnect 130-1. In one embodiment, graphics controller is integrated into MCH 112, such that, in one embodiment, MCH 112 operates as an integrated graphics MCH (GMCH). Representatively, MCH 112 is also coupled to main memory 106 via interconnect 107. In one embodiment, main memory 106 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

As further illustrated, chipset 110 includes an input/output (I/O) controller hub (ICH) 120 coupled to MCH 112 via point-to-point interconnect 121. Representatively, ICH 120 may couple endpoint devices 132-2 and 132-3 and switch 131 to chipset 110 via interconnects 130-2, 130-3, 130-4 and 130-5. Although chipset 110 is illustrated as including a separate MCH 112 and ICH 120, in one embodiment, MCH 112 may be integrated within CPU 102. In an alternate embodiment, the functionality of MCH 112 and ICH 120 are integrated within chipset 110. In one embodiment, chipset 110 may be incorporated into CPU 102 to provide a system on chip.

Representatively, computer system 100 further includes non-volatile (e.g., Flash) memory 108. In one embodiment, flash memory 108 may be referred to as a "firmware hub" or FWH, which may include a basic input/output system (BIOS) 109 to perform initialization of computer system 100. In one embodiment, platform configuration software (PCS) 201 performs initialization of MDN response logic 200 and MDN request logic 300 for providing MDNs on a point-to-point interconnect, according to one embodiment.

In one embodiment, MDN response logic 200 and MDN request logic 300 may be implemented within computer systems including an MCH integrated within a CPU, an MCH and ICH integrated within a chipset, as well as a system on-chip. Accordingly, those skilled in the art recognize that FIG. 1 is provided to illustrate one embodiment and should not be construed in a limiting manner. In one embodiment, peripheral endpoint (EP) devices 132 (132-1, 132-2, 132-3, 132-4) are coupled to chipset 110 via point-to-point links 130 (130-1, 130-2, 130-4, 130-5 and 130-6).

In one embodiment, point-to-point links 130 may support a point-to-point link protocol including, but not limited to, common system Interface (CSI), peripheral component interconnect (PCI) Express (PCIe) or other like point-to-point interconnect. Accordingly, although one or more of the embodiments described herein may be provided with reference to PCIe, those skilled in the art should recognize that the embodiments described herein are not limited to point-to-point links, which support PCIe, and are therefore applicable to other like point-to-point link protocols.

Accordingly, in one embodiment, PCIe links 130 may provide a point-to-point link, such as defined by PCI Express Base Specification Revision 1.1 to allow bi-directional communication between peripheral EP devices 132 and chipset 110. In one embodiment, ICH 120 may include peripheral component interconnect PCIe root ports (not shown) to couple links 120 to link controllers not shown of ICH 120, referred to herein as the "fabric." In one embodiment, MDN response logic 200 and MDN request logic 300 of ICH 120 may be integrated within a link controller or combined into a single unit.

Representatively, peripheral EP devices 132-2 and 132-3 are coupled to link 130-2 via switch 131 and links 130-4 and 130-5, respectively. Consequently, endpoint 132-2 to 132-3 are required to arbitrate for ownership of link 130-2 to issue transactions. Such arbitration is required since endpoints 132 are generally not allowed to simultaneously drive link 130-2. As described herein, an endpoint that is requesting data is referred to as a "requester." Likewise, an endpoint from which data is requested is referred to as a "completer." As further described herein, a device coupled to a point-to-point link may be referred to herein as a "link device."

As described herein an upstream component (UC) may refer to a component which is above or closer to CPU 102 whereas a downstream component (DC) may refer to a component which is below or away from CPU 102. Accordingly, as shown in FIG. 1, MCH 112 may be referred to as an upstream component (UC) whereas ICH 120 may be referred to as a downstream component (DC) in relation to MCH 112 and an upstream component (UC) in relation to endpoints 132. As further illustrated in FIG. 1, a peripheral EP 132 may be directly coupled to chipset 110 via link 130. Representatively, endpoint 132-4 is directly coupled to ICH 120 via link 130-6. Although the embodiments described herein may be provided with reference to examples wherein the point-to-point links couple peripheral endpoint devices 132 to chipset 110, those skilled in the art should recognize that the embodiments described herein may be provided to any point-to-point links, such as, for example, common serial interface (CSI) of FSB 104 for coupling chipset 110 to CPU 102, or other like point-to-point link.

Accordingly, as shown in FIG. 1, peripheral endpoint devices 131, which are coupled to chipset 110 via point-to-point links 130 generally do not provide support for multiple internal (logical) device components. In other words, endpoint peripheral devices 132 are generally limited to including a one-to-one map between an internal logical device and the respective endpoint. This deficiency is retained from conventional PCI, which requires a one-to-one mapping between an internal device and the piece of silicon or card module that plugs into a slot of a computer system. As further shown in FIG. 1, MCH 112 may be coupled to ICH 120 via a point-to-point interconnect 121. In one embodiment, point-to-point interconnect 121 is a proprietary derivative of PCIe, which may referred to herein as direct media interconnect (DMI) 121.

Conventionally, because DMI 121 is a proprietary interconnect, DMI 121 may allow ICH 120 to implement multiple device numbers on interconnect 121 associated with a DMI port. Conventionally, this may be performed through pre-allocation of device numbers on a selected logic bus (for example, bus zero (0)) between MCH 112 and ICH 120 during design of chipset 110. This conventional requirement of pre-allocating device numbers on DMI 121 limits chipset partitioning flexibility. PCIe does not allow multiple device numbers to be applied at an upstream port.

Conventionally, the device numbers used in MCH 112 and ICH 120 would be pre-allocated to allow the components to instantiate multiple devices on the selected bus. Unfortunately, this mechanism effectively restricts chipset partitioning to a single ICH 112 connected to a single MCH 120 through DMI 121. Accordingly, in one embodiment the limitation of conventional PCI regarding the support of multiple device numbers is overcome by including MDN response logic 200 and MDN request logic 300 within the respective components of computer system 100.

Figure 2:
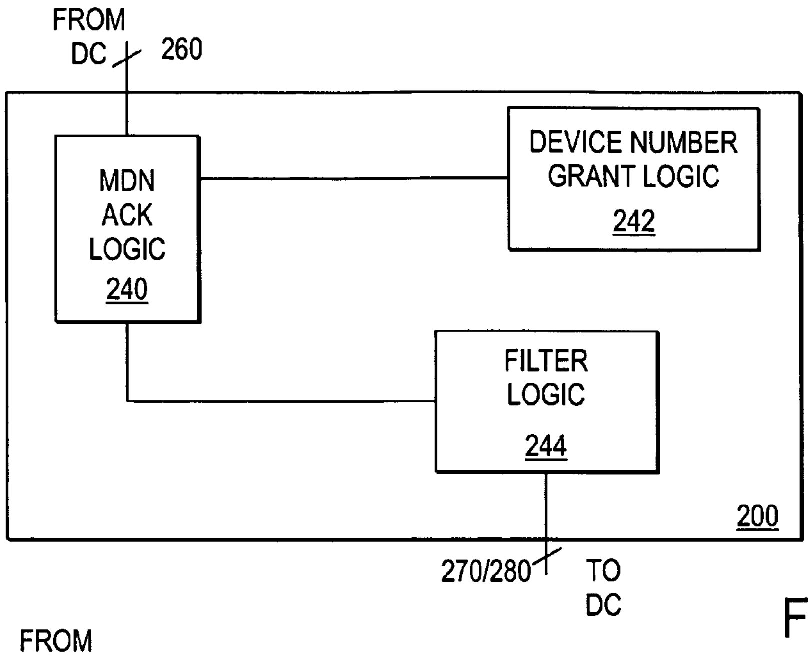
FIG. 2 is a block diagram further illustrating multiple device number (MDN), response logic of FIG. 1, according to one embodiment.

FIG. 2 further illustrates MDN response logic 200 for allocation of multiple device numbers to a downstream component or DC according to one embodiment. Representatively MDN response logic 200 may receive MDN request 260 (see FIG. 4) from a downstream component. In one embodiment, MDN request 260 may be received by MDN acknowledgement (Ack) logic 240. In one embodiment, MDN Ack logic 240 may query MDN request 260 to determine a quantity of requested device numbers. In one embodiment, according to the quantity of requested device numbers, device number grant logic 242 may determine a quantity of device numbers allocated to the downstream component.

For example, for a PCIe interconnect, a quantity of devices that can be instantiated on a bus is generally limited to thirty-two (32) devices; in practice the amount of devices that may be implemented may be less than 32 devices. Accordingly, in the embodiments described, based on available device numbers which are in use by an upstream component, the upstream component, using device number grant logic 242, may determine a quantity of device numbers that may be allocated to a downstream component. Once determined, in one embodiment, MDN acknowledgement logic 240 may generate an acknowledgement (Ack) MDN 270, which is provided to the DC.

Figure 4:
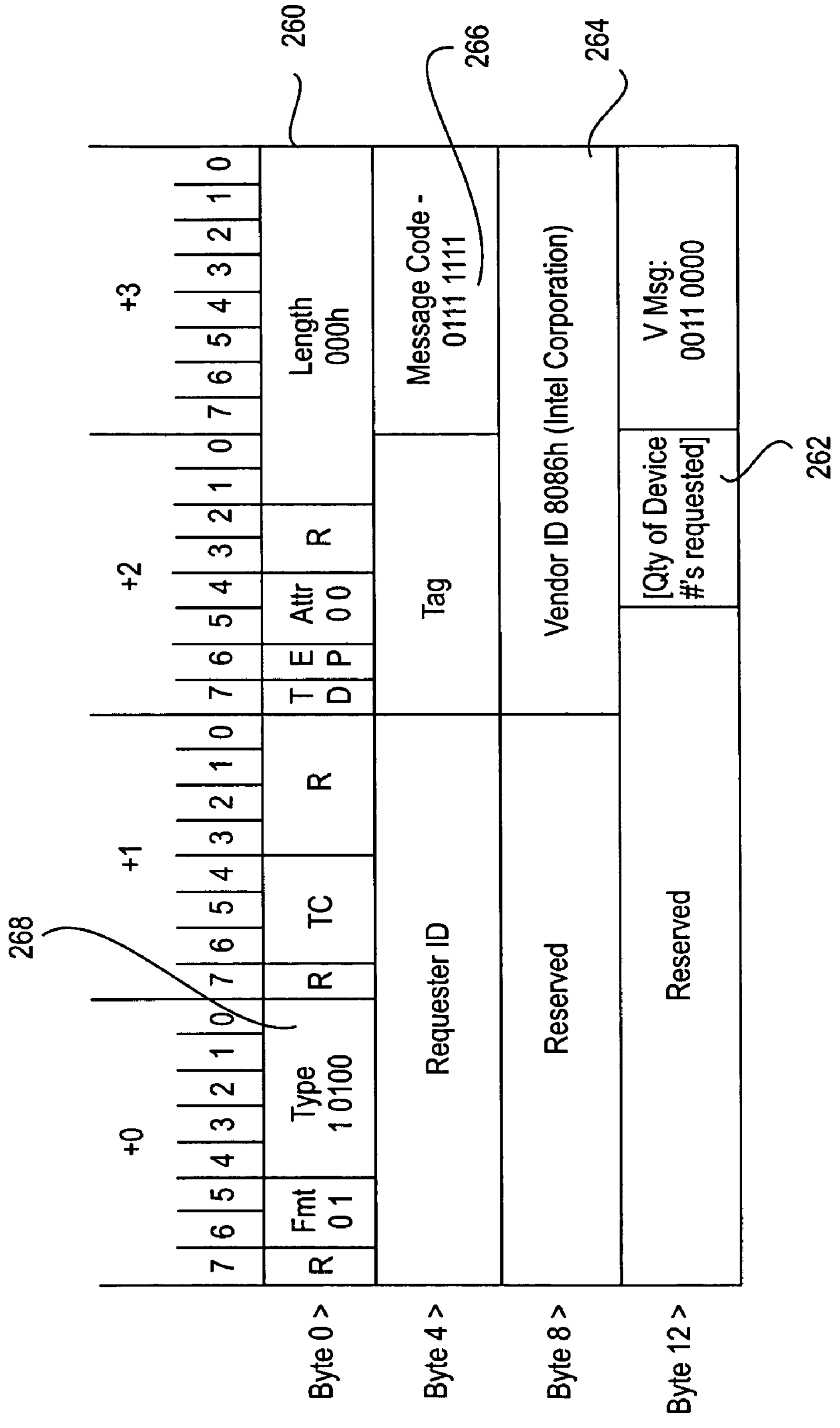
FIG. 4 is a transmission layer packet for requesting multiple device numbers, according to one embodiment.
Figure 5:
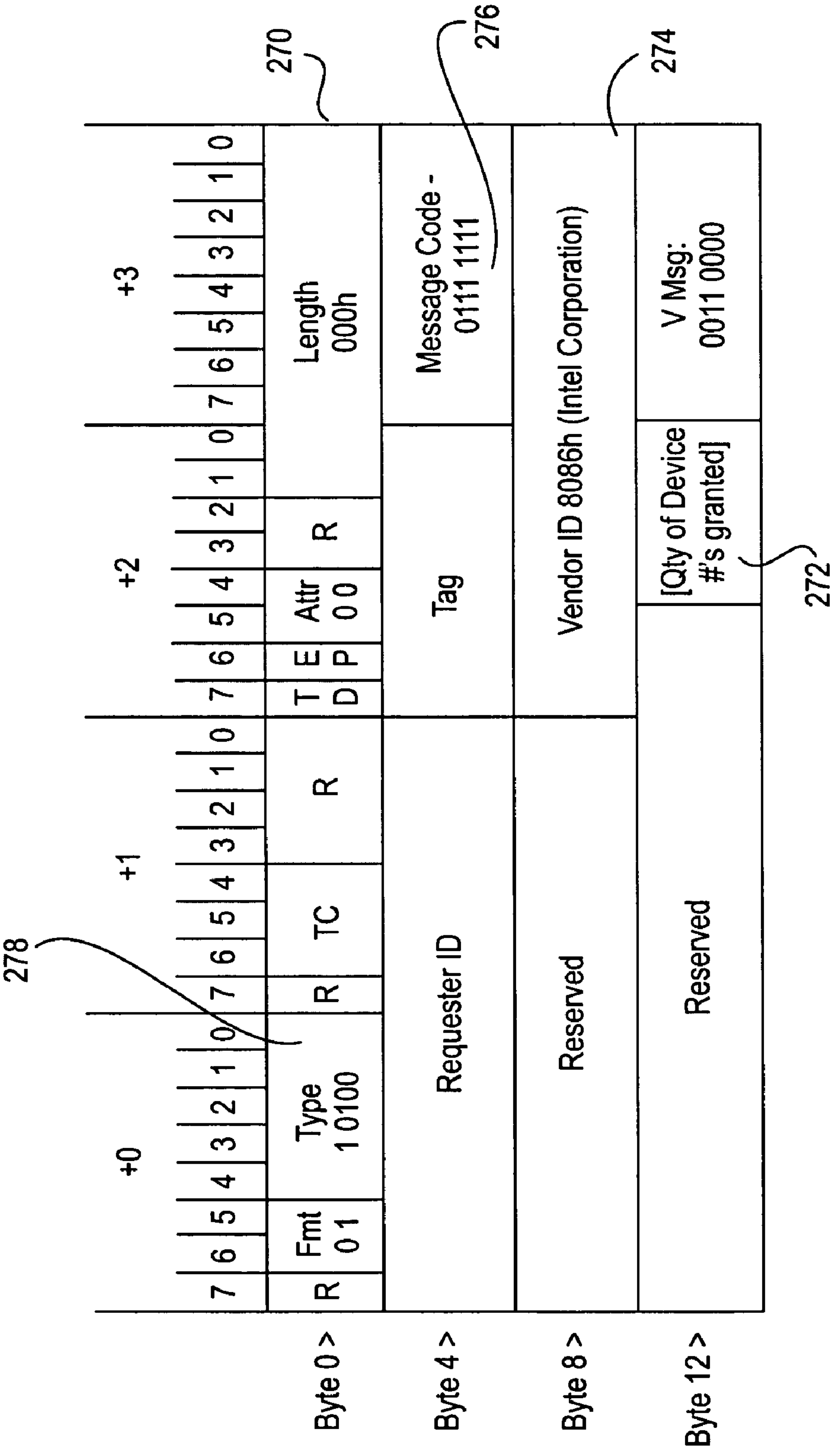
FIG. 5 is a block diagram illustrating a transmission layer packet to provide an acknowledgement MDN response to indicate a quantity of allocated device numbers, according to one embodiment.

In one embodiment, an Ack MDN 270 is shown in FIG. 5. Similarly, FIG. 4 illustrates Request MDN 260, according to one embodiment. Representatively, Ack MDN 270 (FIG. 5) includes a quantity of device numbers granted 272, whereas Request MDN 260 (FIG. 4) includes a quantity of device numbers requested 262. Although shown in FIGS. 4 and 5 to include a message code 266/276, and a vendor ID 264/274, in one embodiment, a generic message may be used to communicate the quantity of allocated device numbers 272 (FIG. 5) and the quantity of requested device numbers 262. However in the embodiments illustrated, Ack MDN 270 and request MDN 260 are, for example, a transmission layer packets (TLPs).

As further shown in FIGS. 4 and 5, request MDN 260 and Ack MDN 270 include message type 268, which indicates local routing, such that the message is terminated at the receiver. As further illustrated in FIGS. 4 and 5, Request MDN 260 and Ack MDN 270 include a vender defined type one message code, which is silently discarded by the completer if multiple device number capability is not implemented.

In one embodiment, the distribution of multiple device numbers by MDN response logic 200 to a DC is performed according to a two message handshake protocol between DCs and UCs using a Request MDN 250 and Ack MDN 270, upon link establishment. In one embodiment, link establishment is indicated by, for example, a status indication such as a received DL_Up status from a data link layer. As described herein link initialization is a physical layer control process that configures and initializes a device, a physical layer, port and associated link, so that normal packet traffic can be processed on the link. This process may be automatically initiated after reset without any software involvement. A subset of link training and initialization, referred to herein as "link training," is initiated automatically after wakeup from a low power mode or due to an error conditioning that renders the link inoperable.

Figure 3:
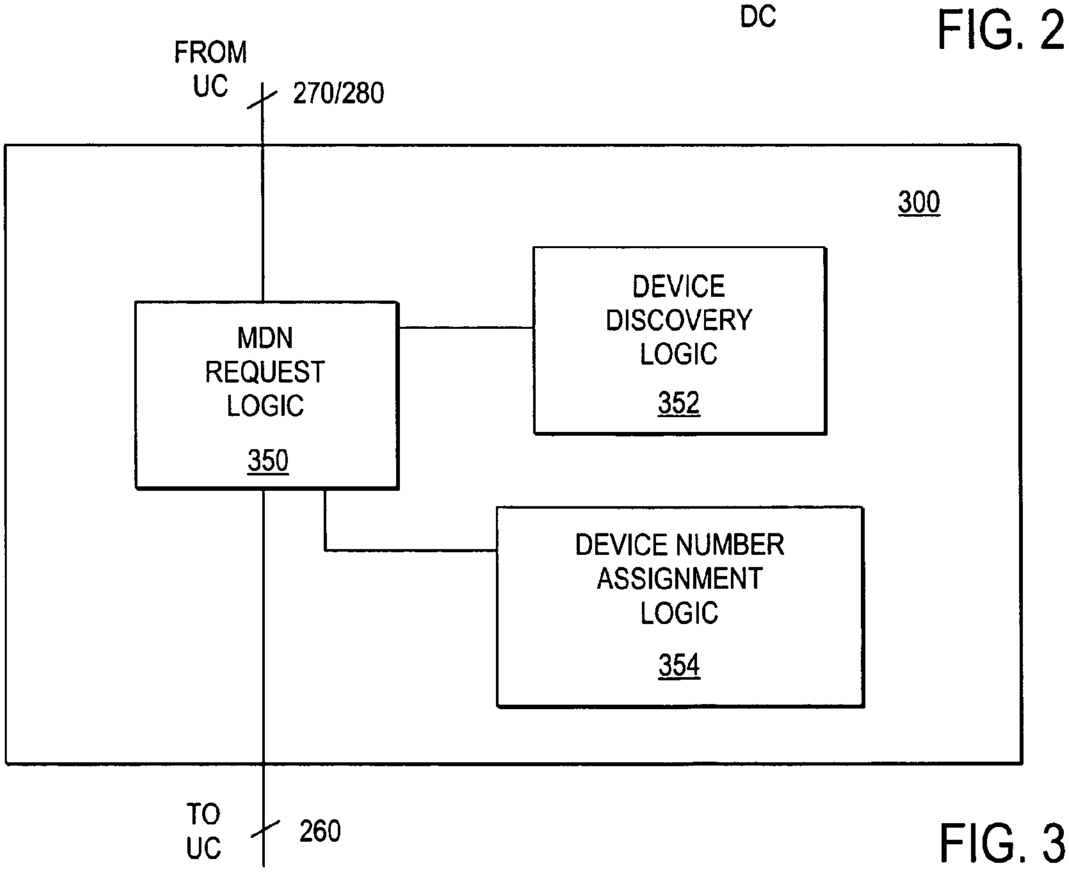
FIG. 3 is a block diagram further illustrating MDN request logic of FIG. 1, according to one embodiment.

FIG. 3 further illustrates MDN request logic 300 of FIG. 1 according to one embodiment. Representatively MDN request logic 300, in one embodiment, transmits Request MDN 260 and a transaction layer packet (TLP) to the upstream component indicating support for multiple device numbers and a quantity of device numbers requested 262. As indicated above, in one embodiment, illustrating the format of the TLP for Request MDN 260 is shown in FIG. 4. In one embodiment, prior to link establishment, device discovery logic 352 may identify the various internal devices of the peripheral endpoints or other like system component, as shown in FIG. 3.

Referring again to FIG. 2, upon receipt of request MDN 260, the upstream component or UC transmits a TLP as Ack MDN 270 to the DC indicating a quantity of allocated device numbers 272. In one embodiment, the response TLP or Ack MDN 270, as shown in FIG. 5, is sent prior to transmission of any configuration requests downstream to allow the downstream component to configure themselves to attempt to accommodate the number of allocated device numbers. In one embodiment, configuration of the DC may be required in situations where the number of allocated device numbers is less than the quantity of requested device numbers.

In one embodiment it is the responsibility of the DC to make the best possible use of available device numbers although the specific handling is implementation specific. As described above, the format of the Ack MDN 270 is shown in FIG. 5. Accordingly, in one embodiment, issuance of the Ack MDN is performed prior to device enumeration, for example, using platform configuration software (PCS) 201, as shown in FIG. 1.

Referring again to FIG. 2, following device enumeration by PCS 201, filter logic 244 may limit the passing of type 0 configuration requests forwarded to the DC to those type 0 configuration requests that are directed to a device number allocated to the DC. Accordingly, in contrast to conventional PCIe, in which DC's hardwire the assignment of particular device numbers to the devices within a component, in one embodiment, a DC dynamically assigns device numbers according to received type 0 configuration requests using, for example, device number assignment logic 354, as shown in FIG. 3.

In one embodiment, the DC does not assume that assigned device numbers are contiguous. In one embodiment, using, for example, device number assignment logic 354 of FIG. 3, the DC dynamically assigns the internal devices a respective device number per type 0 configuration request forwarded from the UC. Accordingly, in one embodiment, MDN request logic 300 and MDN response logic 200 allows endpoints and the upstream ports of switches to have more than one logical device, which in turn means more than one bus number is allocated to the bus corresponding to the link between the two components.

For example, a DC may implement five internal devices: A, B, C, D and E. However, the UC is limited to four available device numbers and indicates such quantity to the DC via an Ack MDN 270 (FIG. 5). Subsequently, the DC may determine that the device C may be sacrificed due to deficient quantities of available bus numbers; as a result, the DC may not map device C to device number. As shown in FIG. 2, filter logic 244 of MDN response logic 300 filters type 0 configuration requests 280 to the DC. In one embodiment, forwarded type 0 configuration requests to the DC are limited to allocated device numbers (e.g., 5, 7, 8 and 11).

In one embodiment, as each type 0 configuration request 280 is received, device number assignment logic 354 (FIG. 3) determines if the device number associated with the received configuration request is already assigned to an internal device of the DC. Accordingly, for configuration requests 280 having a device number which is previously assigned to an internal device of the DC, the configuration request is simply routed to the respective device. However, for type 0 configuration requests 280, including a device number that is not previously assigned to an internal device of the DC, device number assignment logic 354 may assign the device number to an unassigned internal device and rout the configuration request to the respective device.

Accordingly, in one embodiment, the first type 0 configuration request is directed to a first unassigned device (e.g., device 5). In response to receipt of the first configuration request device, number assignment logic 354 may assign this device number to the internal device (e.g., device A). Accordingly the succeeding device numbers are assigned in a similar manner. In one embodiment, the UC is not permitted to change device numbers that it forwards to a particular downstream port unless the DC has been through a fundamental reset. In one embodiment if more device numbers are forwarded than are required by the DC, the component is required to complete, as unsupported requests, any configuration request directed to bus numbers not mapped to some internal device. When multiple device numbers are used, it is necessary for the UC to support their use for configuration routing, completion routing and routing of messages by ID.

TABLE 1

DEVICE CAPABILITIES REGISTER

| Bit Location | Register Description | Attributes |
| --- | --- | --- |
| x | Multiple Logical Devices Supported - Applies to downstream ports and logical Device 0, Function 0 of upstream ports only. A value of 1b indicates that the port supports the association of multiple logical device numbers with the bus number corresponding to the link between the upstream and downstream ports. If this capability is not supported or not applicable, this bit must be hardwired to 0b. | RO |

To provide the multiple device number functionality on point-to-point interconnects and upstream ports, in one embodiment, endpoints may be provided with a device capabilities register to indicate whether an endpoint or chipset supports multiple logical devices. In one embodiment, a description of the register is provided with reference to Table 1. As indicated, the multiple logical device capability may apply to downstream ports and logical device zero, function zero of the upstream ports. If the capability is not supported or not applicable, this bit may be hardwired to a predetermined value. As shown in Table 1, a value “1B” (e.g., binary digit 1) indicates that the port supports the association of multiple logical device numbers with the bus numbers corresponding to the link between the upstream and downstream ports. As further illustrated in Table 1, a value of “0B” (e.g., binary digit 0) may indicate that this capability is not supported or not applicable.

TABLE 2

DEVICE CONTROL REGISTER

| Bit Location | Register Description | Attributes |
| --- | --- | --- |
| y | Multiple Logical Devices Enabled - Applies to downstream ports and logical Device 0, Function 0 of upstream ports. Software may write a value of 1b to enable the port to associate multiple logical device numbers with the bus number corresponding to the link between the upstream and downstream ports. Upstream ports that implement this capability, when this bit is set, may do the following: Assign logical device numbers to all logical devices implemented by the component Handle as Unsupported Requests all ID routed Requests, including Configuration Requests, that are addressed to device numbers not implemented by the component Correctly associate completions returned to the component with the logical device that issued the corresponding request Downstream ports that implement this capability, when this bit is set, passes to the downstream component all ID routed TLPs (including Completions and Configuration Requests) that are addressed to the logical bus number associated with the link between the upstream and downstream ports. Software ensures that this capability is present in both the upstream and downstream ports before enabling the capability in either. When enabling this capability, software enables the capability in the upstream port (downstream component) before enabling the capability in the downstream (Root or Switch) port. If this capability is not supported or not applicable, this bit may be hardwired to 0b. | RW |

As further shown in Table 2, a device control register is described, which indicates that multiple logical devices are enabled, according to one embodiment. As indicated in Table, 2, the multiple logical device capability applies to logical device 0, function zero of upstream ports. To utilize this register, software writes a value to enable the port associated with the multiple logical device numbers; the values written may be bus numbers corresponding to the link between the upstream and downstream ports. As indicated by Table 2, upstream ports perform the following functionality if this bit is enabled, including assigning logical device numbers to all logical devices implemented by the component, handling unsupported requests and associating completions returned to the component with the logical device that issued the corresponding request.

In one embodiment, a downstream ports support this capability by passing, to the downstream component, all ID routed TLPs based on the logical device number associated with the link between the upstream and downstream ports. As indicated, software ensures whether the capability is present in both the upstream and downstream ports before enabling such capability. In one embodiment, software enables the capability in the upstream port (downstream component) before enabling the capability in the downstream (root or switch) port.

In one embodiment, providing MDN capability with a computer system allows endpoints and the upstream ports of switches to have more than one logical device, which in turn means more than one bus number is allocated to the bus corresponding to the link between the two components. Hence, when multiple logical device capability has been enabled, the component downstream from the bridge is permitted to implement multiple logical devices. For multi-device components, device numbers are assigned by the component.

In one embodiment, functions are required to capture the bus number supplied with all configuration write requests (type 0) completed by the function and supply this number in the bus number field of the requester ID for all requests initiated by the device/function. When the multiple logical device capability is implemented and enabled, multiple-device components are permitted to implement multiple device numbers on their upstream ports. In this situation, the upstream component forwards TLPs directed to all device numbers to the downstream component, and the downstream component handles TLPs directed to unimplemented devices as unsupported requests and unexpected completions for requests and completions, respectively.

Figure 6:
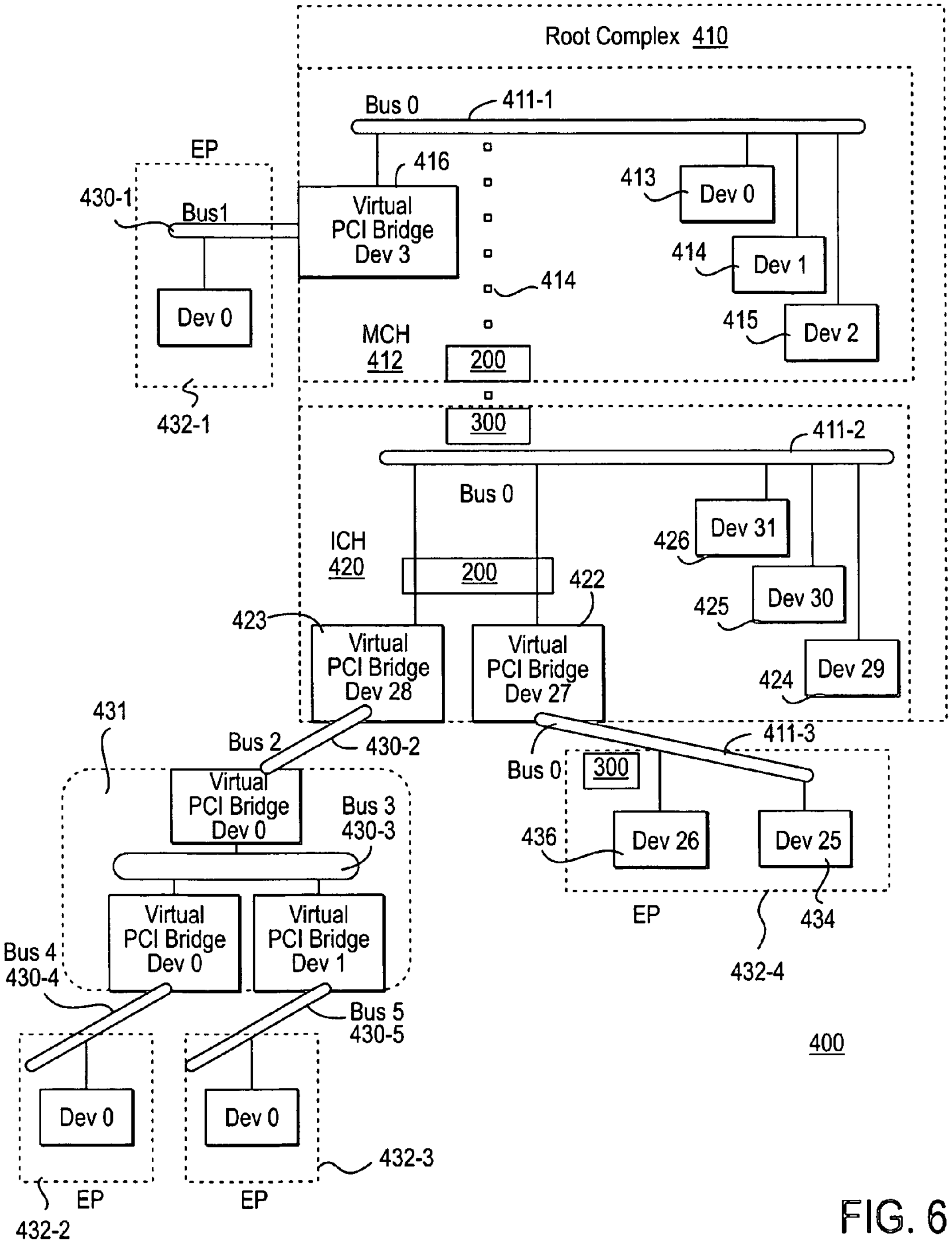
FIG. 6 is a block diagram further illustrating the computer system of FIG. 1 to illustrate an endpoint having multiple internal devices, according to one embodiment.

FIG. 6 is a block diagram illustrating a computer system 400, including MDN response logic 200 and MDN request logic 300 to, for example, enable a peripheral endpoint device to support multiple device numbers, according to one embodiment. In the embodiment illustrated, components of computer system 400 are similar to the components shown in computer system 100 of FIG. 1.

Representatively, computer system 100 includes a root complex 410, which is similar to the chipset of computer system 100 of FIG. 1. In the embodiment illustrated, the various buses, devices and functions of computer system 400 are numbered according to a bus enumeration process. At power-up time, platform configuration software, or PCS, such as, for example, PCS 201 as shown in FIG. 1, is provided with a limited awareness of the configuration of computer system 400. In one embodiment, PCS is limited to knowledge regarding the existence of bus zero 411-1. As described herein, the term "bus zero" may refer to a selected logical bus that resides on the downstream side of the host/bridge (root complex 410). As a result, PCS 201 is not aware of the devices that reside on bus zero 411-1. Accordingly, during the enumeration process, PCS software 201 discovers the various buses that exist and the devices and functions, which reside on each bus.

As shown in FIG. 6, root complex 410 supports multiple bus zero type interconnects, according to one embodiment. As shown, a first bus zero 411-1 supports device zero (Dev 0) 413, device one (Dev 1) 414 and device two (Dev 2) 415. In the embodiments shown, MCH 412 further includes device three 416, which in one embodiment, represents a virtual PCI bridge for endpoint 432-1, which is coupled to bus one 430-1. As further shown in FIG. 6, root complex 410 may include ICH 420, which also supports bus zero bus 411-2. As shown, ICH may include devices 422 and 423. In the embodiment illustrated, devices 422 and 423 may represent virtual PCI bridges for coupling either switch 431 or endpoint 432-4 to ICH 420.

In contrast to peripheral endpoint 132-4, as shown in FIG. 1, in the embodiment illustrated in FIG. 6, endpoint 432-4 provides support for multiple device components. Representatively, device 434 (DEV 25) and device 436 (DEV 26) are coupled to a third bus zero bus 411-3. Accordingly, during enumeration of computer system 400, the enumeration may proceed by a depth first search, such that devices 434 and 436 are assigned device numbers 25 and 26, respectively. Likewise, as part of the depth first search, devices 422 and 423 are assigned device numbers 27 and 28, respectively. Likewise, devices 424, 425 and 426 are assigned device numbers 29, 30 and 31 according to the depth first enumeration.

As shown in FIG. 6, endpoint devices 432-2 and 432-3 are shown in a similar configuration, as in FIG. 1, to include a single logical device per endpoint to comply with the conventional PCI of one-to-one mapping, as described above. Representatively, switch 431 includes bus three 430-3 and virtual PCI bridge device zero for bus two 430-2 and virtual device bridges associated with device zero and device one for bus 430-3.

In the embodiment illustrated in FIG. 6, during initialization of computer system 400, ICH 420 may discover devices 423, 422, 426, 425 and 424. However, prior to issuing an MDN request to MCH 412, MDN response logic 200 may receive an MDN request from endpoint device 432-4, which includes a request for multiple device numbers for devices 434 and 436 of endpoint 432-4. Accordingly, in one embodiment, MDN request logic 200 may issue an MDN request to MCH 412, which includes a request for eight device numbers. In response to such request, MDN response logic 200 of MCH 412 may determine available bus zero device numbers.

In the embodiment illustrated in FIG. 6, device numbers 0-3 have been assigned. Accordingly, MCH 412 provides the availability of the eight device numbers requested by ICH 420. In one embodiment, MDN response logic 200 of MCH 412 may issue an Ack MDN 270 (FIG. 5) indicating the allocation of the eight device numbers to ICH 420. Based on the allocation of such device numbers, the actual assignment of such device numbers is performed by MDN request logic 300 of ICH 420. In one embodiment, the assignment is performed according to received configuration requests.

In one embodiment, configuration requests may refer to configuration read or write requests that take the form of a type zero configuration read or write request. In one embodiment, MCH 412, which is referred to as an upstream component (UC), filters configuration requests received from platform enumeration software. In one embodiment, the allocation of device numbers by MDN response logic 200 is performed prior to enumeration of platform devices, buses and functions.

Accordingly, in one embodiment, during enumeration of computer system 400, PCS 201 may issue configuration type zero requests. In response to such requests, MDN response logic 200 may filter such requests, such that requests provided to a downstream component, such as ICH 420, are limited to configuration requests that match a device number allocated to the downstream component. Accordingly, in the embodiment illustrated, MDN response logic 200 filters received configuration requests from the platform configuration software to such requests directed to device numbers 25-31. In response to such receipt of configuration requests, MDN request logic 300 of ICH would assign the received configuration request to the various devices.

As further shown in FIG. 6, EP 342-4 will issue an MDN request to MDN response logic 200 of ICH 420. In response, MDN response logic 200 would filter type zero configuration requests limited to those associated with device (Dev 25) 434 and device (Dev 26) 436. In response to receipt of such configuration requests, MDN response logic 300 may assign the device numbers to devices 434 and 436, respectively. Accordingly, in the embodiment illustrated, EP 432-4, in addition to ICH 420, discover respective internal logical devices during link initialization, such that once link 411-3 is established, the various Ack MDN 270 (FIG. 5) and request MDN 260 (FIG. 4) are exchanged between the components.

Figure 7:
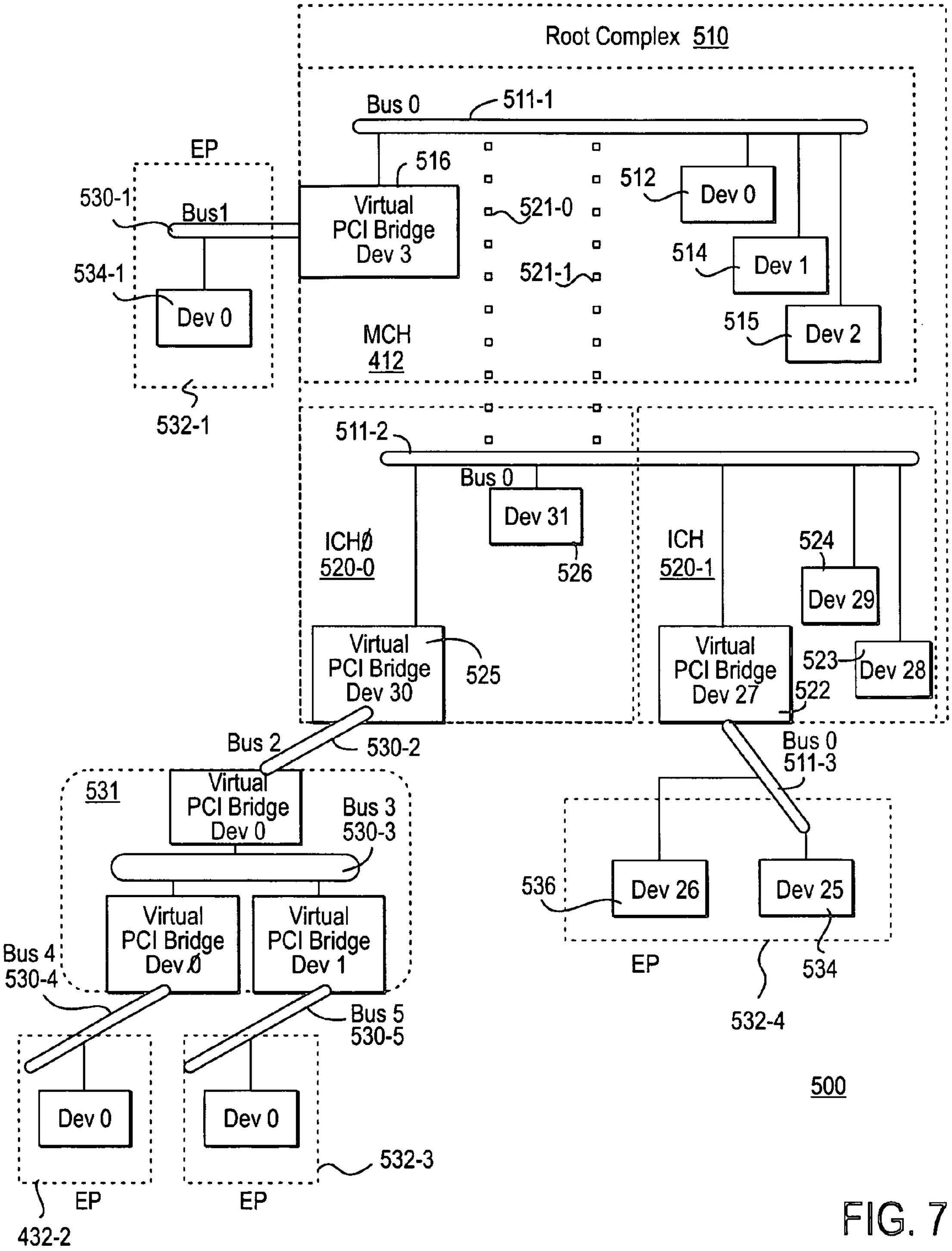
FIG. 7 is a block diagram further illustrating the computer system of FIG. 1, wherein the computer system includes a partitioned I/O controller hub (ICH), according to one embodiment.

FIG. 7 is a block diagram illustrating a computer system 500, which provides a partitioned I/O controller hub (ICH) to support multiple document numbers, according to one embodiment. Representatively, FIG. 7 includes analogous features to the computer system of FIG. 6, with similar components referred to by corresponding reference numerals. However, as shown in FIG. 7, ICH 520 is partitioned into ICH zero (ICH0) 520-0 and ICH one (ICH1) 520-1. Accordingly, in the embodiment provided, ICH 1 520-1 may discover devices 524 and 525 during link initialization.

In one embodiment, EP 532-4 may discover devices 534 and 536 during link initialization. Subsequently, MDN response logic 200 of each ICH may issue an MDN request to MCH 412. Likewise, ICH0 520-0 may issue an MDN request for device 423 and device 426. In response, MDN response logic 200 of MCH 512 may issue an Ack MDN indicating a number of allocated device numbers for each ICH and filter configuration type zero requests received from platform enumeration software to enable dynamic assignment of device numbers to the various devices of each endpoint ICH and MCH.

Accordingly, in contrast to conventional PCIe upstream ports, which are limited to eight functions that can be implemented using a multi-function device structure, computer system 500 overcomes this limitation by enabling flexible partitioning of the chipset blocks into multiple components. Accordingly, in contrast to statically assigning device numbers for bus zero devices, the MCH determines, at run-time, how to decode and steer traffic.

Accordingly, in one embodiment, as shown in FIG. 7, a flexible chipset implementation is provided by using MDN request logic 200 and MDN response logic 300 to enable the development of chipsets that are specifically tailored to the requirements of particular platforms. For example as shown in FIG. 7, the ICH could be split into two parts: a baseline component (ICH0 520-0) common to all platforms and a second personality component (ICH1 520-1) that implements a feature set optimized to either home or office platforms, as appropriate. As a result, design cost may be reduced by eliminating the silicon wasted for implementing a super set of required features in a single component ICH shared by all platforms, regardless of the individual system requirements. Furthermore, development expenses can be reduced by creating smaller and simpler components that are easier to design and validate. Procedural methods for implementing one or more embodiments are now provided.

Figure 8:
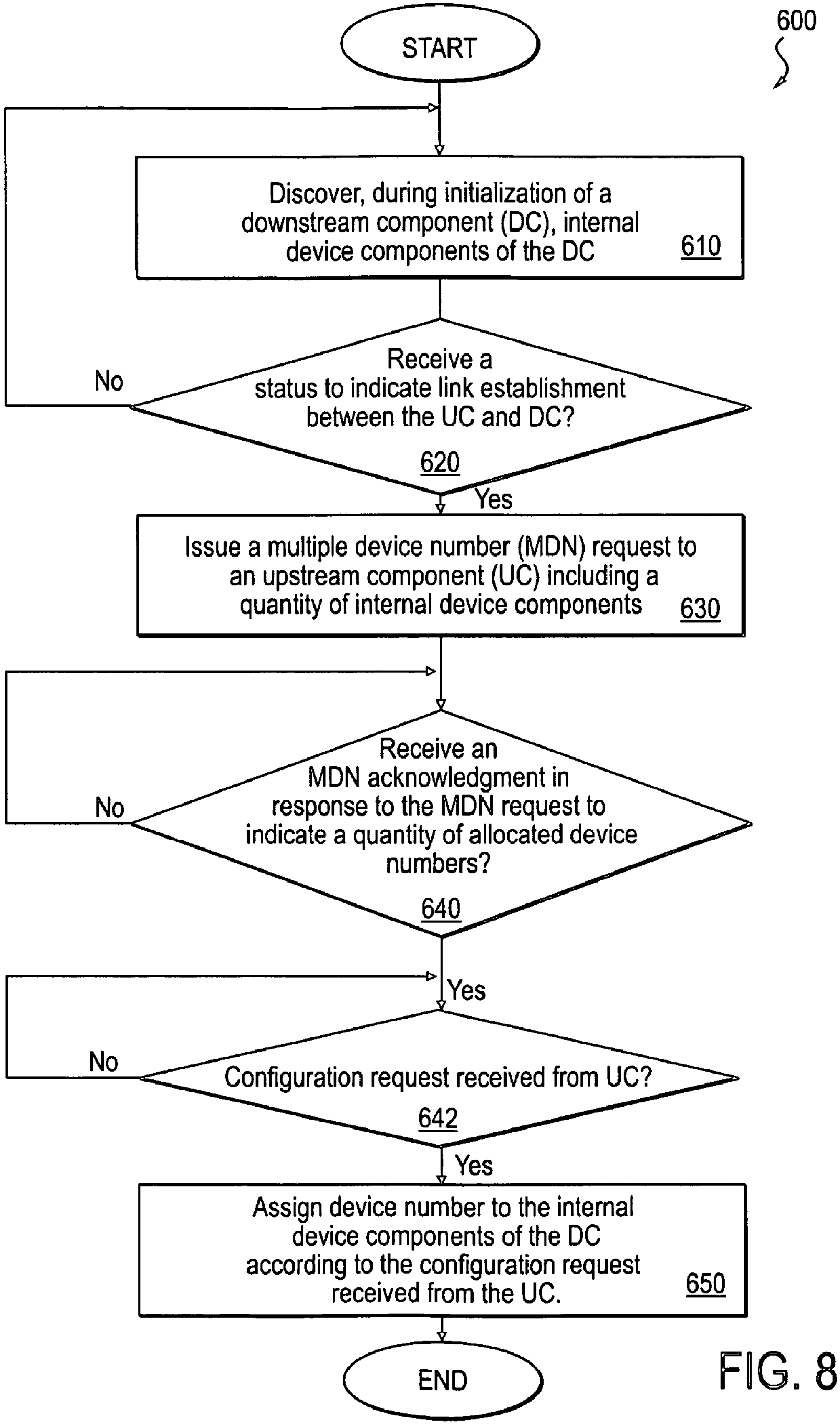
FIG. 8 is a flowchart illustrating a method for supporting multiple device numbers in a point-to-point link, according to one embodiment.

Turning now to FIG. 8, the particular methods associated with various embodiments are described in terms of computer software and hardware with reference to a flowchart. The methods to be performed by a computing device (e.g., an endpoint/link controller) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments are not described with reference to any particular programming language. It will be appreciated that a variety of programming languages may be used to implement embodiments as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 8 is a flowchart illustrating a method 600 for providing multiple device number support within, point-to-point link upstream port, in accordance with one embodiment. In the embodiments described, examples of the described embodiments will be made with reference to FIGS. 1-7. However, the described embodiments should not be limited to the examples provided to limit the scope provided by the appended claims.

Referring again to FIG. 8, at process block 610, internal device components of a downstream component (DC) are discovered during initialization of the DC. Once discovered, at process block 620, it is determined whether a status is received to indicate link establishment between an upstream component (UC) and the DC. For example, as shown in FIG. 6, during link establishment between EP 432-4 and ICH 420, prior to establishment of such link, the DC component, or endpoint device 432-4, may discover internal devices 434 (Dev 25) and 436 (Dev 26).

Referring again to FIG. 8, at process block 630, once link establishment is determined, a multiple device number (MDN) request may be issued to the upstream component of the DC, including a quantity of requested device numbers based on the discovered, internal device components of the DC. In one embodiment, the MDN request may take the form illustrated in FIG. 4. Continuing with the previous example, ICH 420, which is the upstream component of endpoint 432-4, receives the MDN request at MDN response logic 200.

Referring again to FIG. 8, at process block 640, it is determined whether an MDN acknowledgement is received in response to the MDN request. In one embodiment, the MDN acknowledgement, or Ack MDN, may take the form shown in FIG. 5 to indicate a quantity of allocated device numbers 272. Once the Ack MDN is received, at process block 642, it is determined whether a configuration request is received from the UC. In one embodiment, the received configuration request is directed to a device number allocated by the UC. In response to receipt of such configuration request, at process block 650, a device number may be assigned to an internal device component of the DC according to the received configuration request. Additional details regarding the assignment of device numbers, as described at process block 650, are provided with reference to FIG. 9.

Figure 9:
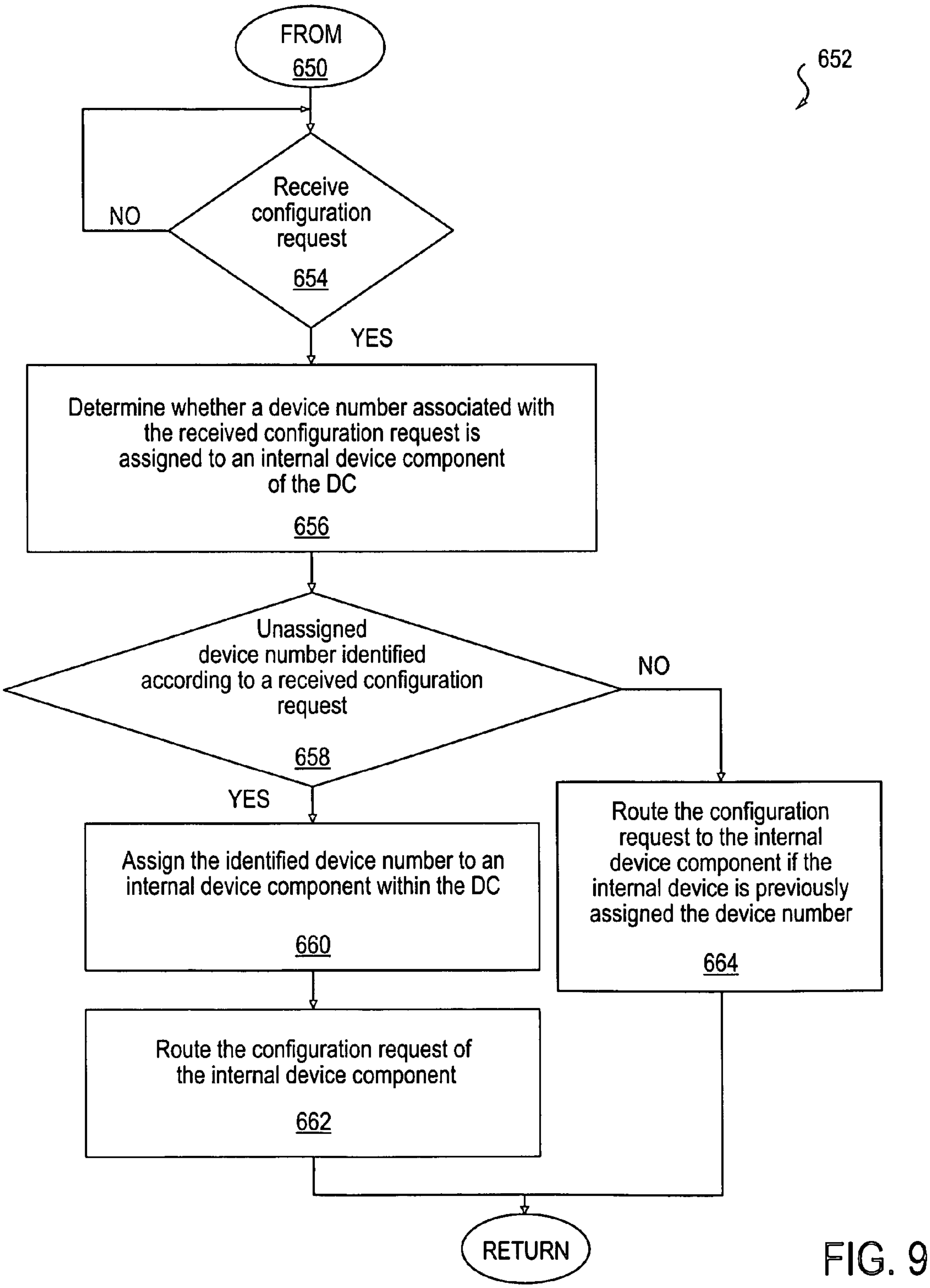
FIG. 9 is a flowchart illustrating a method for assigning device numbers to internal devices of a downstream component, according to one embodiment.

FIG. 9 is a flowchart illustrating a method 652 for assigning device numbers to internal devices of a downstream component, according to received configuration requests of one embodiment. At process block 654, it is determined whether a configuration request is, for example, a type zero configuration request that is issued to an upstream component by, for example, platform configuration software during platform enumeration, such as PCS 201, as shown in FIG. 1.

Referring again to FIG. 9, at process block 656, it is determined whether a device number associated with the received configuration request is assigned to an internal device component of the DC. At process block 658, an unassigned device number may be identified according to the received configuration request. Accordingly, when the device number associated with the received configuration request is currently unassigned, the DC, at process block 660, may assign the identified device number to an internal device component within the DC. Otherwise, at process block 664, the device number associated with the received configuration request is previously assigned to an internal device of the downstream component.

Accordingly, at process block 664, the configuration request is routed to the internal device component to which the device number was previously assigned. Likewise, at process block 662, the configuration request is routed to the internal device component that is assigned the device number associated with the received configuration request. For example, as shown in FIG. 6, MDN response logic 200 of ICH 420 would filter configuration type zero request received from platform configuration software. In accordance with one embodiment, MDN response logic 200 would limit the transmission of configuration request to EP 432-4 that are directed to either Dev 25 (434) or Dev 26 (436). Accordingly, once those configuration requests are initially received, the MDN response logic 300 assigns the device numbers to the devices 434 and 436 of EP 432-4.

Figure 10:
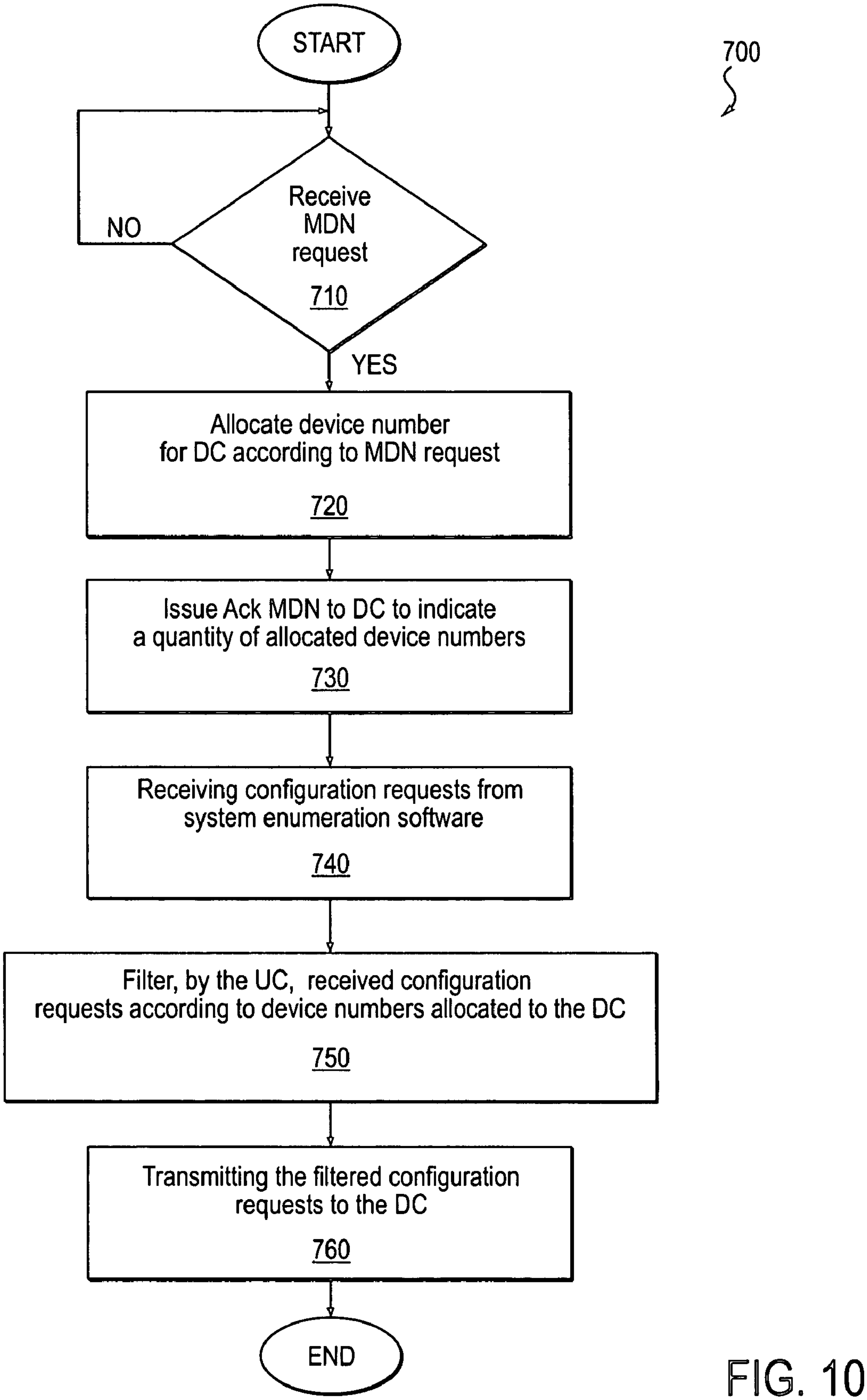
FIG. 10 is a flowchart illustrating a method for allocating device numbers to the internal devices of a downstream component, according to one embodiment.

FIG. 10 is a flowchart illustrating a method 700 for allocating device numbers to a downstream component according to a received MDN request, according to one embodiment. At process block 710, it is determined whether an MDN request is received. Once received, at process block 720, an upstream component allocates device numbers for a downstream component according to the received MDN request. Once allocated, at process block 730, the upstream component may issue an acknowledgement (Ack MDN) to the DC to indicate a quantity of allocated device numbers. In one embodiment, the Ack MDN 270 may take the form illustrated in FIG. 5.

Referring again to FIG. 10, at process block 740, system enumeration software, during platform enumeration, may issue configuration requests that are received by the upstream component. In response to receipt of such configuration requests, the upstream component may filter the received configuration requests according to device numbers allocated to a respective downstream component. Subsequently, at process block 760, the filtered configuration requests are transmitted to the downstream component to enable MDN response logic of the downstream component to dynamically assign device numbers to the various internal devices of the downstream component.

Figure 11:
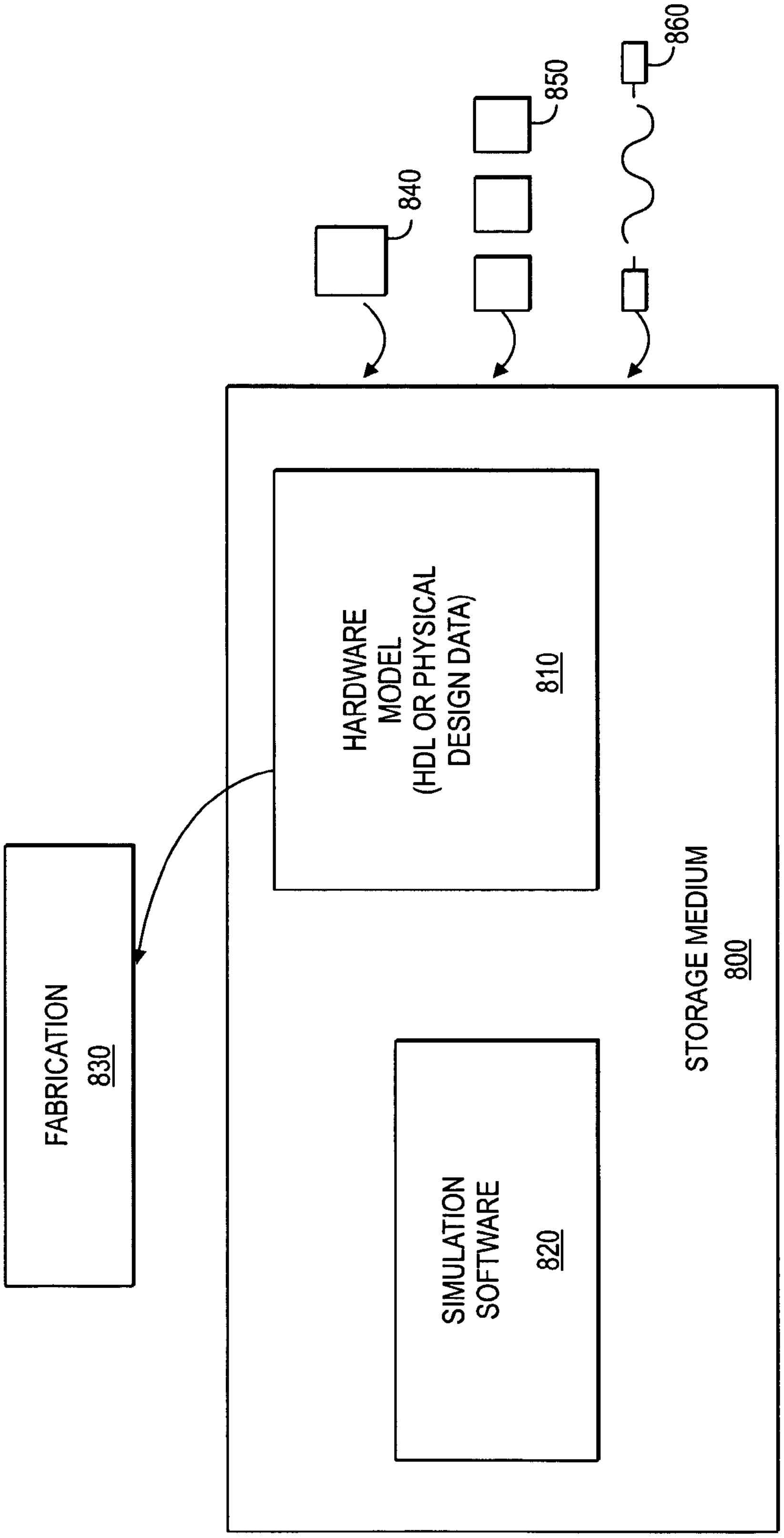
FIG. 11 is a block diagram illustrating various design representations for formats for simulation, emulation and fabrication of a design, using the disclosed techniques.

FIG. 11 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 810 may be stored in a storage medium 800, such as a computer memory, so that the model may be simulated using simulation software 820 that applies a particular test suite 830 to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable medium. An optical or electrical wave 860 modulated or otherwise generated to transport such information, a memory 850 or a magnetic or optical storage 840, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

ALTERNATE EMBODIMENTS

It will be appreciated that, for other embodiments, a different system configuration may be used. For example, while the system 100 includes a single CPU 110, for other embodiments, a multicore processor or multiprocessor system (where one or more processors may be similar in configuration and operation to the CPU 102 described above) may benefit from the supporting multiple device number on point-to-point links and upstream points of various embodiments. Further different type of system or different type of computer system such as, for example, a server, a workstation, a desktop computer system, a gaming system, an embedded computer system, a blade server, etc., may be used for other embodiments.

Elements of the embodiments may also be provided as a machine-readable medium for storing the machine-executable instructions. The machine-readable medium may be a machine-readable storage medium including, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other machine-readable transmission medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A method comprising:

discovering, during initialization of a downstream component (DC), internal device components of the DC;

issuing a multiple device number (MDN) request to an upstream component (UC) including a count of internal device components; and assigning unique device numbers to the internal device components of the DC according to configuration requests received from the UC, to enable a DC endpoint to implement multiple logical devices.

2. The method of claim 1, wherein prior to discovering, the method further comprises:

receiving a status to indicate link establishment between the UC and DC; and transmitting a transmission layer packet (TLP) to the UC, the TLP including the count of internal device components to form as the MDN request.

3. The method of claim 1, wherein issuing the MDN request further comprises:

receiving an MDN acknowledgement in response to the MDN request to indicate a quantity of allocated device numbers; and configuring the internal devices components of the DC according to the quantity of allocated device numbers.

4. The method of claim 1, wherein assigning the device numbers further comprises:

receiving a configuration request from the UC;

determining whether a device number associated with the received configuration request is assigned to an internal device component of the DC;

routing the configuration request to the internal device component if the internal device is previously assigned the device number; and assigning the device number to an internal device component for which a device number is unassigned if the device number is unassigned.

5. The method of claim 4, further comprising:

routing the configuration request to the unassigned internal device component.

6. The method of claim 1, further comprises:

receiving configuration requests from system enumeration software; and filtering, by the UC, the received configuration requests according to device numbers allocated to the DC.

7. An article of manufacture having a machine readable storage medium including associated data, wherein the data, when accessed, results in the machine performing:

transmitting a multiple device number (MDN) request, including a quantity of requested device numbers; and dynamically assigning device numbers according to received configuration requests, to enable a downstream component (DC) endpoint to implement multiple logical devices.

8. The method of claim 7, wherein the operations of transmitting the MDN request further results in the machine performing operations comprising:

discovering, during initialization of a DC, internal device components of the DC; and transmitting a transmission layer packet (TLP) to an upstream component (UC) of the DC, the TLP including a count of internal device components to form the MDN request.

9. The method of claim 7, wherein the operations of dynamically assigning device numbers further results in the machine performing operations comprising:

receiving, by a downstream component (DC), a configuration request; and determining whether a device number associated with the received configuration request is assigned to an internal device component of the DC;

identifying an unassigned device number according to a received configuration request;

assigning the identified device number to an internal device component within the DC; and routing the configuration request of the internal device component.

10. The method of claim 7, wherein the operation of transmitting the MDN request further results in the machine performing operations comprising:

receiving an MDN acknowledgement in response to the MDN request to indicate a quantity of allocated device numbers; and configuring internal device components of the DC according to the quantity of allocated device numbers.

11. An apparatus comprising:

a controller, including multiple device number (MDN) response logic to receive a multiple device number (MDN) request, including a quantity of requested device numbers for internal devices of a downstream component (DC), the MDN response logic to issue an MDN acknowledgement in response to the MDN request to indicate a quantity of allocated device numbers, to enable a DC endpoint to implement multiple logical devices.

12. The apparatus of claim 11, wherein the DC further comprises:

MDN assignment logic to dynamically assign device numbers to the internal devices of the DC according to received configuration requests from the controller.

13. The apparatus of claim 11, further comprising:

device initialization software to set an MDN bit if the DC supports multiple device numbers, wherein the DC to include an MDN register including the MDN bit to indicate one of support and non-support of multiple device numbers.

14. The apparatus of claim 12, wherein the MDN request logic further comprises:

device discovery logic to discover, during initialization of the DC, internal device components of the DC and to transmit a transmission layer packet (TLP) to the controller, the TLP including a quantity of the internal devices of the DC to form the MDN request.

15. The apparatus of claim 11, wherein the MDN response logic further comprises:

MDN filter logic to receive configuration request from platform enumeration software and to filter the received configuration requests according to device numbers allocated to the DC.

16. A system comprising:

a dynamic random access memory (DRAM);

a processor;

a chipset coupled to the processor and the DRAM, the chipset having at least one input/output (I/O) controller hub (ICH) including multiple device number (MDN) response logic to receive at least one multiple device number (MDN) request, including a quantity of requested device numbers for internal devices of a downstream endpoint, the MDN response logic to issue an MDN acknowledgement in response to the MDN request to indicate a quantity of allocated device numbers; and the endpoint coupled to the ICH, the endpoint including at least two internal devices and MDN assignment logic to assign device numbers to the internal devices of the endpoint according to received configuration requests, to enable the endpoint to implement multiple logical devices.

17. The system of claim 16, wherein the chipset further comprises:

a memory controller hub (MCH) and at least two I/O controller hubs, each I/O controller hubs to transmit a multiple device number request, including a quantity of requested device numbers for internal devices of each respective ICH and to assign device numbers to the internal devices of the respective MCH according to configuration requests received from the MCH.

18. The system of claim 16, wherein the endpoint further comprises:

at least one register including at least one bit to indicate one of support and non-support for multiple device numbers.

19. The system of claim 16, wherein the MDN request logic further comprises:

device discovery logic to discover, during initialization of the endpoint, an amount of internal device components of the endpoint and to transmit a transmission layer packet (TLP) to the chipset, the TLP including the quantity of the internal devices of the endpoint to form the MDN request.

20. The system of claim 19, further comprising:

a flash memory to store device initialization software to set an MDN bit of a structure if system endpoint devices support multiple device numbers.

* * * * *

UNITED STATES PATENT AND TRADEMARK OFFICE

CERTIFICATE OF CORRECTION

PATENT NO. : 7,660,922 B2
APPLICATION NO. : 11/433018
DATED : February 9, 2010
INVENTOR(S) : David J. Harriman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 865 days.

Signed and Sealed this

Twenty-eighth Day of December, 2010

David J. Kappos
*Director of the United States Patent and Trademark Office*